Jan. 29, 1924.

W. B. McALLISTER 1,481,846

STEERING WHEEL AND METHOD OF MAKING SAME

Filed Feb. 11, 1920

Inventor
William B. McAllister.
By Day, Oberlin & Day
Attorneys

Patented Jan. 29, 1924.

1,481,846

UNITED STATES PATENT OFFICE.

WILLIAM B. McALLISTER, OF CLEVELAND, OHIO.

STEERING WHEEL AND METHOD OF MAKING SAME.

Application filed February 11, 1920. Serial No. 357,936.

*To all whom it may concern:*

Be it known that I, WILLIAM B. MCALLISTER, a citizen of the United States, and a resident of Cleveland, county of Cuyahoga, and State of Ohio, have invented a new and useful Improvement in Steering Wheels and Methods of Making Same, of which the following is a specification, the principle of the invention being herein explained, and the best mode in which I have contemplated applying that principle, so as to distinguish it from other inventions.

The present invention, relating, as indicated, to an improved steering wheel, and a method of making the same, is particularly directed to an improved steering wheel rim to be used in the steering mechanism of motor driven vehicles and the like, and to a method of making such a rim which shall be less expensive and require less labor than the present methods, while providing a very much stronger and better rim. Obviously, however, the present method is also adapted to the manufacture of other annular or curved articles, such, for example, as the felloes of wheels or disks to be used for various purposes, and the principle of my invention may be applied to the manufacture of such articles with but slight modifications, which will readily suggest themselves to those skilled in the arts. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
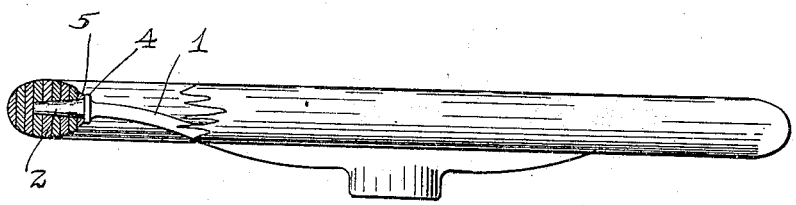
Figure 2:
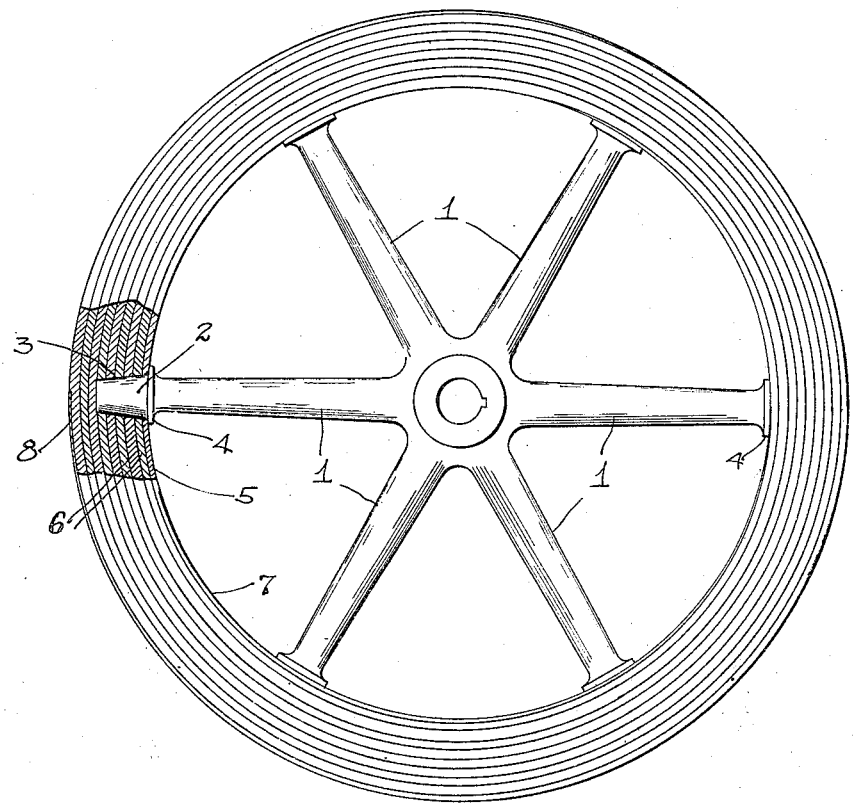

Fig. 1 is a side elevation of my improved steering wheel, partially shown in section; and Fig. 2 is a plan view, also partially in section.

Steering wheel rims are at present manufactured either by taking a single piece of wood and steaming it until it is sufficiently flexible to be bent into a circle when its ends are suitably joined, or by taking a series of curved sections and assembling them with broken joints into a finished rim. Either of these methods is objectionable because of the joints, and also because of the expense and the hand work which is necessary to complete them, while the cost of the wood which must be used for this purpose is also a considerable item in the cost of such rims. Another serious objection to the present steering wheel rims is the possibility of the spider working loose from the rim and pulling out, which has in some cases caused very serious accidents to the occupants of the vehicle. This possibility arises from the fact that after the rims have been built a series of notches are formed on one face, into which the ends of the spider are inserted, after which wooden plugs are inserted in these notches above the spider arms and fastened. As these plugs are only glued or secured to the rest of the rim they sometimes become loose and occasionally pull out.

My improved method consists, briefly stated, in taking a long strip of very thin wood, such, for example, as veneer, and then coiling it upon itself until an annular member has been built up of the desired thickness, while at the same time forming this rim about the ends of spider arms to securely fasten the spider into the rim.

In Fig. 1 there is shown a steering wheel spider 1 provided with enlarged ends 2. Each end is formed with beveled sides 3 and has laterally projecting flanges 4. It will be understood that while this particular spider construction is of advantage, as will appear presently, it is not essential, and the usual spider may also be used.

I take a long strip of thin veneer and coil a strip upon itself, starting the innermost layer by fastening it over the ends of the arms 1. In order to do this I previously cut openings at suitable intervals in the strip to fit over the respective arms, and of course the distance between the openings in the strip must be so arranged that the increasing diameter of the rim or wheel as it is formed is compensated for in order to bring the holes in the proper positions to engage over the ends of the arms. The first layer of the strip of veneer 5 is adapted to rest against the flanges 4 on the head 2 of the various arms of the spider, and the successive layers 6 are provided with openings which engage snugly against the beveled sides 3 of the spider ends. The outermost layers of the strip are coiled beyond the outer end of the spider arms. As shown in Fig. 2 of the drawing, two or more thin strips of wood may be used in the construction of the annular member of this invention. In such cases the inner ends of each strip start from the inner periphery of the rim, and the outer ends of each said strips terminate at the outer periphery thereof.

A suitable waterproof glue is applied to the inner surface of the strip before it is coiled, and after the rim or wheel is completed it should be held in a suitable mold or press for a period sufficient to allow the glue to fully set, this period being usually about 72 hours. After that the wheel is machined to the desired cross-sectional shape and the outer and inner surfaces are turned down to a true circular form, thus cutting the inner end 7 and the outer end 8 of the strip to a long drawn-out feather edge.

A steering wheel manufactured in this way is very much stronger than those formed of a single solid strip of wood, as there are no joints in the present wheel, and the ends of the spider arms are permanently fastened and built into the rim itself, which cannot be the case where the rim is made of a single piece of wood which is merely bent into a circular form.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. A steering wheel comprising a central spider having radial arms, a laterally projecting flange formed on each of said arms and spaced from the ends thereof, and a laminated wooden rim mounted upon said spider, each of the inner laminations of said rim being provided with a series of spaced aligned openings fitting over the ends of said arms outwardly of said flanges.

2. A steering wheel comprising a central spider having radial arms, a laterally projecting flange formed on each of said arms and spaced from the ends thereof, enlarged ends with beveled sides formed at the extremities of said arms outwardly of said flanges, and a laminated wooden rim mounted upon said spider, each of the inner laminations of said rim being provided with a series of spaced aligned openings fitting over said enlarged ends.

3. In a method of making steering wheels, the steps which consist in forming a series of spaced aligned openings in a strip of veneer, coiling such strip about a wheel spider, such openings being arranged to successively engage over the arms of said spider, and fastening the veneer to each other.

Signed by me this 3rd day of February, 1920.

WILLIAM B. McALLISTER.